Figure 1:
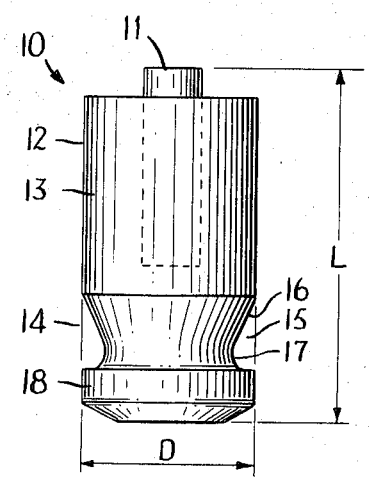

United States Patent [19]
Lejeune

[11] 3,837,386
[45] Sept. 24, 1974

[54] ANTI SKID STUD FOR TIRES
[75] Inventor: Daniel Lejeune, Clermont Ferrand, France
[73] Assignee: Compagnie General des Etablissement Michelin raison Sociale Michelin & Cie
[22] Filed: Apr. 23, 1973
[21] Appl. No.: 353,545

[30] Foreign Application Priority Data
May 5, 1972 France .............................. 72.16299

[52] U.S. Cl. ............................................. 152/210
[51] Int. Cl. ........................................... B60c 11/16
[58] Field of Search ..................................... 152/210

[56] References Cited
UNITED STATES PATENTS
3,196,921   7/1965   Hakka ................................. 152/210
3,545,515   12/1970   Gottauf .............................. 152/210

Primary Examiner—James B. Marbert
Attorney, Agent, or Firm—Brumbaugh, Graves, Donohue & Raymond

[57]   ABSTRACT
An improved anti-skid stud for tires comprises a cylindrical body having a hard point at one end and having one or more intermediate annular grooves.

4 Claims, 2 Drawing Figures

PATENTED SEP 24 1974          3,837,386

ANTI SKID STUD FOR TIRES

The present invention relates to anti-skid studs intended to be embedded and held in the tread of tires in order to improve the adherence thereof on roads covered with glaze or ice.

The popularity of anti-skid studs during the last ten years has led to a large number of the most varied shapes thereof being proposed. Most of them are not used due to their excessively complicated design. The type of stud which has become most popular, on the other hand, has a relatively simple shape and is accordingly relatively cheap to manufacture, while providing good effectiveness.

The conventional stud which has gained acceptance in practice comprises essentially a cylindrical barrel which bears on the one end a tip of tungsten carbide and is extended on the other end by a base having the shape of a spherical cap which protrudes radially around the barrel. This base has a twofold role. First of all, it serves to assure the anchoring of the stud within the tread and to produce axial locking of the stud in addition to the radial clamping of the barrel so as to hold it in the tread. Secondly, the base of the stud transmits to the ground the pressure exerted by the rigid carcass of the tire — the larger the surface of the base of the stud, the greater the force of penetration of the tip into the ground. This explains why the diameter of the base of the stud is substantially greater than the diameter of its barrel; while the barrel retains a diameter of 5 mm., the base has a diameter which, although initially selected at 8 mm., has been increased to 9 mm. and even 10 mm. in order to improve the effectiveness. The conventional stud such as described is not without drawbacks.

A first drawback, and without doubt the most serious one, is that its effectiveness, as great as it may be, is only provisional. It remains effective, as a matter of fact, only as long as the stud is immobilized with its axis perpendicular to the surface of the tread. Now, as can easily be realized, a stud is subjected during travel to considerable tangential forces, that is to say, forces which tend to tilt it. The rubber initially offers effective resistance to the tilting of the base of the stud, but this resistance gradually becomes less, and finally merely serves to maintain the stud in the inclined position which it assumes. In this inclined position, the stud is of very reduced effectiveness and causes damage to the road surface.

A second drawback, of course, is the destructive action which the stud, and particularly its base, exerts on the surrounding rubber. The movements of the stud, counteracted by the rubber, finally impair the latter by subjecting it to substantial abrasion.

A third drawback is the necessity of having special tools for implanting the studs in the holes provided in the tread. These holes have an opening of not more than 2 or 3 mm. and in order to cause a base of a diameter of 8 to 10 mm. to penetrate into them, a substantial force is required.

The present invention is directed at overcoming these drawbacks and provides a stud of simple shape, which is as economical to make as the conventional stud but which holds better in its tread recess without enlarging the latter, nor moving therein, and which therefore results in an effectiveness which, while possibly less, is nevertheless more permanent and does not cause damage to the road surface.

The tire anti-skid stud which is the object of the present invention and comprises a cylindrical barrel having a protruding core of hard material and a base is characterized by the fact that the barrel — whose length does not substantially exceed that of the core — and the base form part of one and the same cylindrical rod which has an intermediate section of a diameter which is reduced by one or more annular grooves.

In accordance with preferred embodiments:

a. The diameter of the stud is greater than or equal to 5 mm.;

b. The stud body or cylindrical rod is of plastic material;

c. The annular grooves are composed of a frustoconical portion which narrows down in the direction towards the base of the stud and is extended by a toric portion.

The anti-skid stud in accordance with the invention which is reduced to a cylindrical body having a point on one end and having one or two annular grooves in its intermediate portion presents many advantages. The increased radial clamping in the grooved portion is sufficient to avoid expulsion under the action of the centrifugal force. Moreover, the absence of anchoring permits the stud to follow and accompany more readily the movements of the rubber which clamps it, without opposing them. This results in a connection which is firmer and produces less abrasion, because it is more flexible. Moreover, the force applied to the road is reduced, as well as the action which the stud can exert on road surfaces. Finally, the stud of the invention can be inserted by hand — a simple rivetsnap is sufficient to force it into its hole in the tread.

The diameter of the stud is advantageously slightly increased. One can use a stud whose barrel has a diameter of, for instance, 6 mm. instead of 5 mm. for the barrel and 8 to 10 mm. for the base as in the case of a conventional stud. This makes it possible to compensate for a slight loss in effectiveness by an increase in the force applied and by a better stability of the position of the stud.

The use of a plastic to form the body of the stud furthermore favors its bonding to the rubber. The same is true of the special shape of the grooves which furthermore assures an easier penetration of the stud into the hole.

Figure 2:
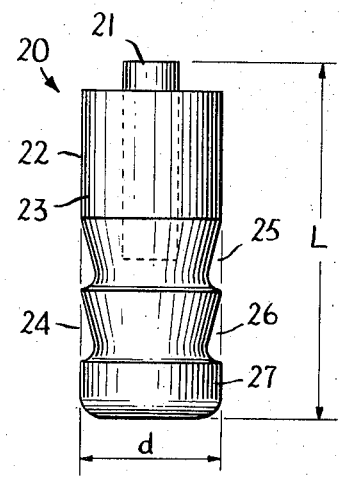

The invention is illustrated by two embodiments which will be described with reference to the accompanying drawings. FIGS. 1 and 2 show — each in elevation — a tire anti-skid stud in accordance with the invention.

FIG. 1 shows a stud 10 having a diameter D of 6 mm. and a length L of 12.5 mm. This stud has a tip or core 11 of tungsten carbide and a covering 12 of soft steel. The covering 12 comprises a first section 13 which is perfectly cylindrical and whose length (7 mm.) is approximately equal to that of the tip 11. It has a second section 14 whose diameter is reduced by an annular groove 15, defined by a frustoconical portion 16 and a toric portion 17. It is terminated by a base 18. As can be seen, the section 13 and the base 18 have precisely the same diameter.

FIG. 2 shows a stud 20 having a diameter $d$ of 5 mm. and a length L of 12.5 mm. It has a tip or core 21 of tungsten carbide and a covering 22 of plastic. The covering comprises a cylindrical barrel 23 of a length (4.5 mm.) substantially less than the length of the tip 21. It also has a section 24 provided with two annular grooves 25 and 26 each defined by frustoconical and toric portions. It is terminated by a base 27 of the same diameter as the barrel 23.

What is claimed is:

1. In a tire anti-skid stud comprising a cylindrical barrel having a protruding core of hard material and a base, the improvement which comprises the barrel, which is of a length not substantially exceeding the length of the core, and the base form part of one and the same cylindrical rod having an intermediate section of a diameter which is reduced by at least one annular groove.

2. The stud defined by claim 1 wherein the diameter of the stud is at least 5 mm.

3. The stud defined by claim 1 wherein the cylindrical rod is of plastic material.

4. The stud defined by claim 1 wherein each annular groove has a frustoconical portion which narrows down in the direction towards the base of the stud and is extended by a toric portion.

* * * * *